United States Patent
Nevin et al.

(10) Patent No.: US 7,366,709 B2
(45) Date of Patent: Apr. 29, 2008

(54) SYSTEM AND METHOD FOR MANAGING QUESTIONS AND ANSWERS USING SUBJECT LISTS STYLES

(75) Inventors: James B. Nevin, New York, NY (US); Abraham Zelkin, Oyster Bay, NY (US); Richard W. Mason, Cos Cob, CT (US); John Steinhoff, NY, NY (US)

(73) Assignee: Xpertuniverse, Inc., New York, NY (US)

( * ) Notice: Subject to any disclaimer, the term of this patent is extended or adjusted under 35 U.S.C. 154(b) by 0 days.

(21) Appl. No.: 11/097,967

(22) Filed: Mar. 31, 2005

(65) Prior Publication Data

US 2005/0262114 A1     Nov. 24, 2005

Related U.S. Application Data

(60) Provisional application No. 60/559,097, filed on Apr. 2, 2004.

(51) Int. Cl.
*G06F 17/30* (2006.01)

(52) U.S. Cl. .................. 707/1; 707/7; 707/9; 706/60
(58) Field of Classification Search ............. 707/1–9; 706/60

See application file for complete search history.

(56) References Cited

U.S. PATENT DOCUMENTS

| | | | | |
|---|---|---|---|---|
| 5,862,223 A | * | 1/1999 | Walker et al. | 705/50 |
| 6,742,003 B2 | * | 5/2004 | Heckerman et al. | 707/104.1 |
| 6,826,552 B1 | * | 11/2004 | Grosser et al. | 706/47 |
| 2001/0037317 A1 | * | 11/2001 | Freiwirth et al. | 705/74 |
| 2003/0105750 A1 | * | 6/2003 | Chaboche | 707/3 |
| 2004/0243588 A1 | * | 12/2004 | Tanner et al. | 707/100 |
| 2005/0015362 A1 | * | 1/2005 | Ostertag et al. | 707/3 |

* cited by examiner

*Primary Examiner*—Don Wong
*Assistant Examiner*—Hanh B Thai
(74) *Attorney, Agent, or Firm*—Darby & Darby P.C.

(57) ABSTRACT

The present invention relates to a system and method of categorizing a user's inquiry and defining the scope of the assistance sought by creating a subject list style. A subject list style is created in a computer based match and route system by selecting a quantity of inquiry criteria and values to present to a user in an interactive manner. The inquiry criteria and values are organized into one or more groups, and an interrelationship between them is defined within each group. The interrelationship may be independent, hierarchical and a combination of independent/hierarchical. Additionally, a parameter is designated that indicates a source of retrieving the inquiry criteria and values. Such a subject list is then presented to a user in an interactive problem definition page.

7 Claims, 6 Drawing Sheets

FIGURE 2

Inquiry Criteria

Get Assistance
Tell us what you need assistance with. It will help us to find the right expert for you.

Line of Business: —201a  Major Coverage: —201b  Form of Coverage: —201c
[Property ▽]  [Building ▽]  [Basic ▽]

Special Exposure: 203                [Mold ▽] —201d

Short Description of the Assistance Request:
need assistance with how to handle a complex claims including mold

Add Attachments (optional)                Values                220
Request a Preferred Expert (optional)

(Get Assistance Now)                (Cancel)

200
Subject Style

FIGURE 3A

Style 1:

<u>301</u>  List 1 ---> List 2 ---> List 3    List 4
Hierarchical  Hierarchical  Hierarchical  Independent
*Get Assistance*  *Get Assistance*  *Get Assistance*  *Get Assistance*

Example:

| List 1 | List 2 | List 3 | List 4 |
|---|---|---|---|
| Fruit | → Berries | → Raspberries | Delivery Schedule |
|  |  | → Strawberries | Shipping Regulations |
|  | → Apples | → Golden Delicious |  |
|  |  | → Macintosh |  |
| Dairy | → Milk | → Unflavored |  |
|  |  | → Chocolate |  |
|  | → Yogurt | → Whole Milk |  |
|  |  | → Lowfat |  |

Style 2:

<u>310</u>  List 1 ---> List 2 ---> List 3    List 4
Hierarchical  Hierarchical  Hierarchical  Independent
Profile  Profile  *Get Assistance*  *Get Assistance*

Example:
Seeker A has "Fruit" and "Berries" in his profile. When that seeker is defining the subject to be discussed with an expert, only List 3 choices of "Raspberries" and "Strawberries" are displayed on the *Get Assistance* page along with List 4 choices.
Seeker B has "Dairy" and "Yogurt" in her profile. When that seeker is defining the subject to be discussed with an expert, only Lists 3 choices of "Whole Milk" and "Lowfat" are displayed on the *Get Assistance* page along with List 4 choices.

Style 3:

<u>320</u>  List 1 ---> List 2    List 3
Hierarchical  Hierarchical  Independent
Profile  *Get Assistance*  *Get Assistance*

Example: In this case, List 3 from the original example in Style 1, would be deleted.

Style 4:

<u>330</u>  List 1    List 2    List 3
Independent  Independent  Independent
Profile  *Get Assistance*  *Get Assistance*

Example: In this case, the three subject lists are independent. If List 2 was deleted from the example in Style 1 (above), then the seeker with "Fruit" in the profile would see/be able to select from the entire fruit list shown in List 3: "Raspberries, Strawberries, Golden Delicious, and Macintosh."

CHOOSE 1 OF THE CRITERIA STYLES BELOW:

1. Criteria 1 Type: Groups Next Criteria → Criteria 2 Type: Groups Next Criteria → Criteria 3 Type: Final Subgroup | Criteria 4 Type: Independent 2. Criteria 1 Type: Groups Next Criteria → Criteria 2 Type: Groups Next Criteria | Criteria 3 Type: Independent | Criteria 4 Type: Independent 3. Criteria 1 Type: Independent | Criteria 2 Type: Independent | Criteria 3 Type: Independent | Criteria 4 Type: Independent 4. Criteria 1 Type: Groups Next Criteria → Criteria 2 Type: Groups Next Criteria → Criteria 3 Type: Final Subgroup 5. Criteria 1 Type: Groups Next Criteria → Criteria 2 Type: Groups Next Criteria | Criteria 3 Type: Independent 6. Criteria 1 Type: Independent | Criteria 2 Type: Independent | Criteria 3 Type: Independent 7. Criteria 1 Type: Groups Next Criteria → Criteria 2 Type: Groups Next Criteria 8. Criteria 1 Type: Independent | Criteria 2 Type: Independent 9. Criteria 1 Type: Independent

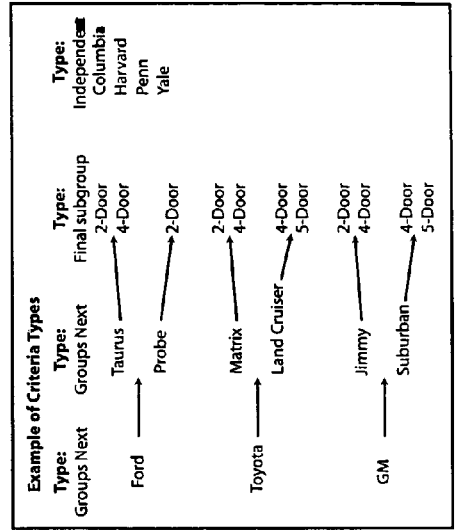

Example of Criteria Types

| Type: Groups Next | Type: Groups Next | Type: Final subgroup | Type: Independent |
|---|---|---|---|
| Ford | → Taurus | 2-Door | Columbia |
|  | Probe | 4-Door | Harvard |
|  |  | 2-Door | Penn |
| Toyota | → Matrix | 2-Door | Yale |
|  |  | 4-Door |  |
|  | Land Cruiser | 4-Door |  |
|  |  | 5-Door |  |
| GM | → Jimmy | 2-Door |  |
|  |  | 4-Door |  |
|  | Suburban | 4-Door |  |
|  |  | 5-Door |  |

FIGURE 3B

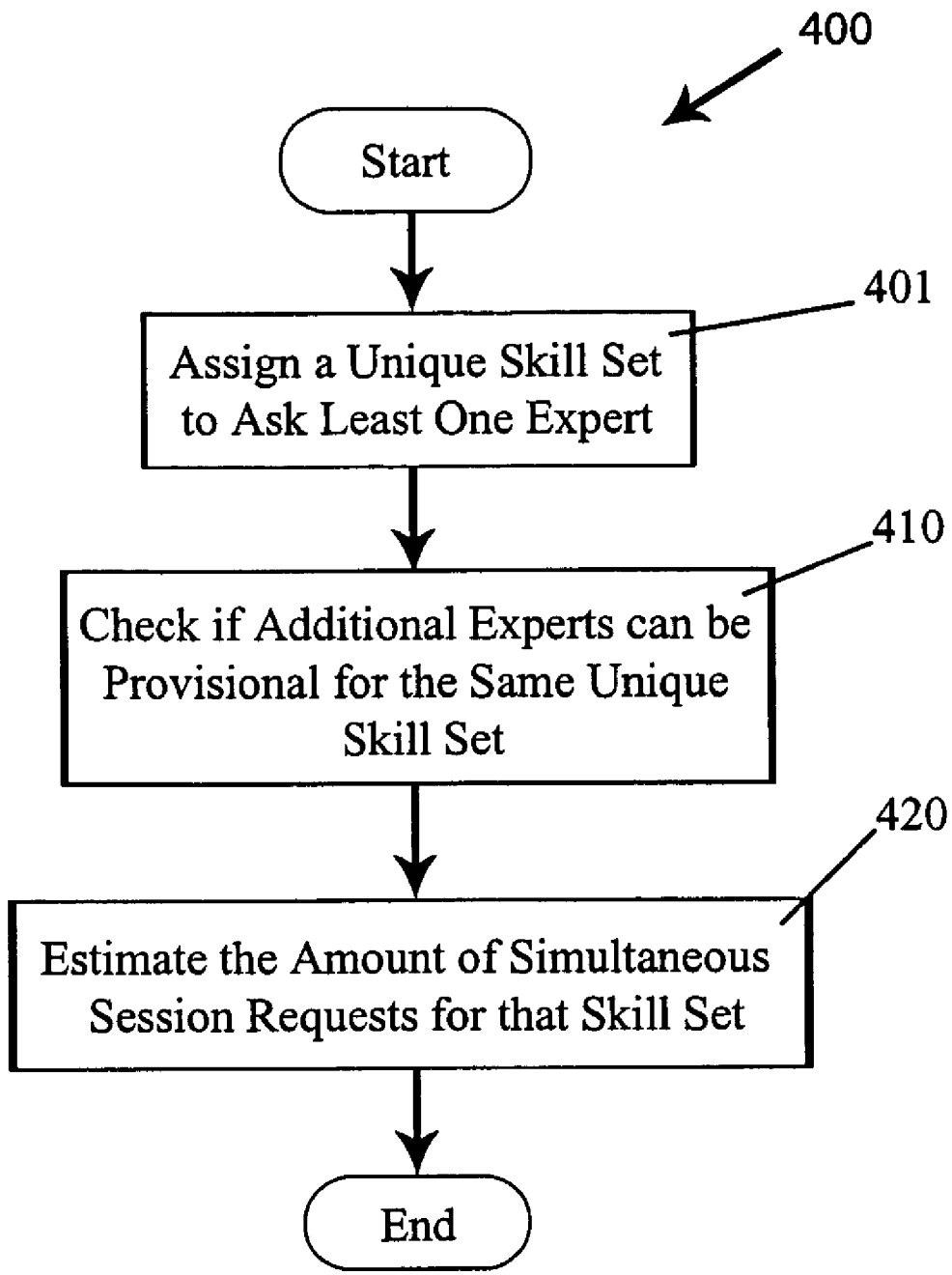

SYSTEM AND METHOD FOR MANAGING QUESTIONS AND ANSWERS USING SUBJECT LISTS STYLES

CLAIM OF PRIORITY

This application claims the benefit of priority under 35 U.S.C. § 119(e) to U.S. Provisional Application No. 60/559,097, filed Apr. 2, 2004, titled "EXPERT LOCATION, COLLABORATION, AND MANAGEMENT PLATFORM" hereby incorporated by reference in its entirety.

FIELD OF INVENTION

The invention relates to categorizing a user's inquiry and defining the scope of the assistance available by creating subject lists styles. More specifically, the invention allows a client to pre-select an overall style for its interactive problem definition pages.

BACKGROUND OF THE INVENTION

As communication methods have evolved, so have the ways in which information may be gathered. A recent study by the Delphi Group indicates that 80% of organizational knowledge assets are stored inside employees' minds. Companies are thus disadvantaged and limited in their ability to share data. Accordingly a need exists to enable organizations to tap into an individual's tacit knowledge and to be able to identify experts within the organization and to route inquiries to the next best available expert. To better focus a search it is desirable to limit the choices available in certain circumstances. Control can be enforced by enabling organizations to select subject list styles.

SUMMARY OF THE INVENTION

In accordance with one aspect of the invention, a computer based match and route system is operable to categorize a user's inquiry and to define the scope of the assistance sought by creating a subject list style. A quantity of inquiry criteria and values are selected and presented to a user in an interactive manner. The inquiry criteria and values are then organized into one or more groups, and an interrelationship is defined within each group between the inquiry criteria and the values. The interrelationship may be independent, hierarchical and a combination of independent/hierarchical. Additionally, a parameter is designated that indicates a source of retrieving the inquiry criteria and values. Such a subject list is then presented to a user in an interactive problem definition page.

These and other aspects, features, steps and advantages can be further appreciated from the accompanying figures and description of certain illustrative embodiments.

BRIEF DESCRIPTION OF THE DRAWING FIGURES

FIG. 2 depicts a template of a user interface created by the embodiment shown in FIG. 1;

FIG. 3A depicts a structure of the subject lists created by the embodiment shown in FIG. 1;

FIG. 3B depicts combinations of hierarchical and independent subject list styles are shown;

FIG. 4 is a flow diagram illustrating steps in accordance with another embodiment of the invention.

DETAILED DESCRIPTION OF THE ILLUSTRATIVE EMBODIMENTS

Figure 1:
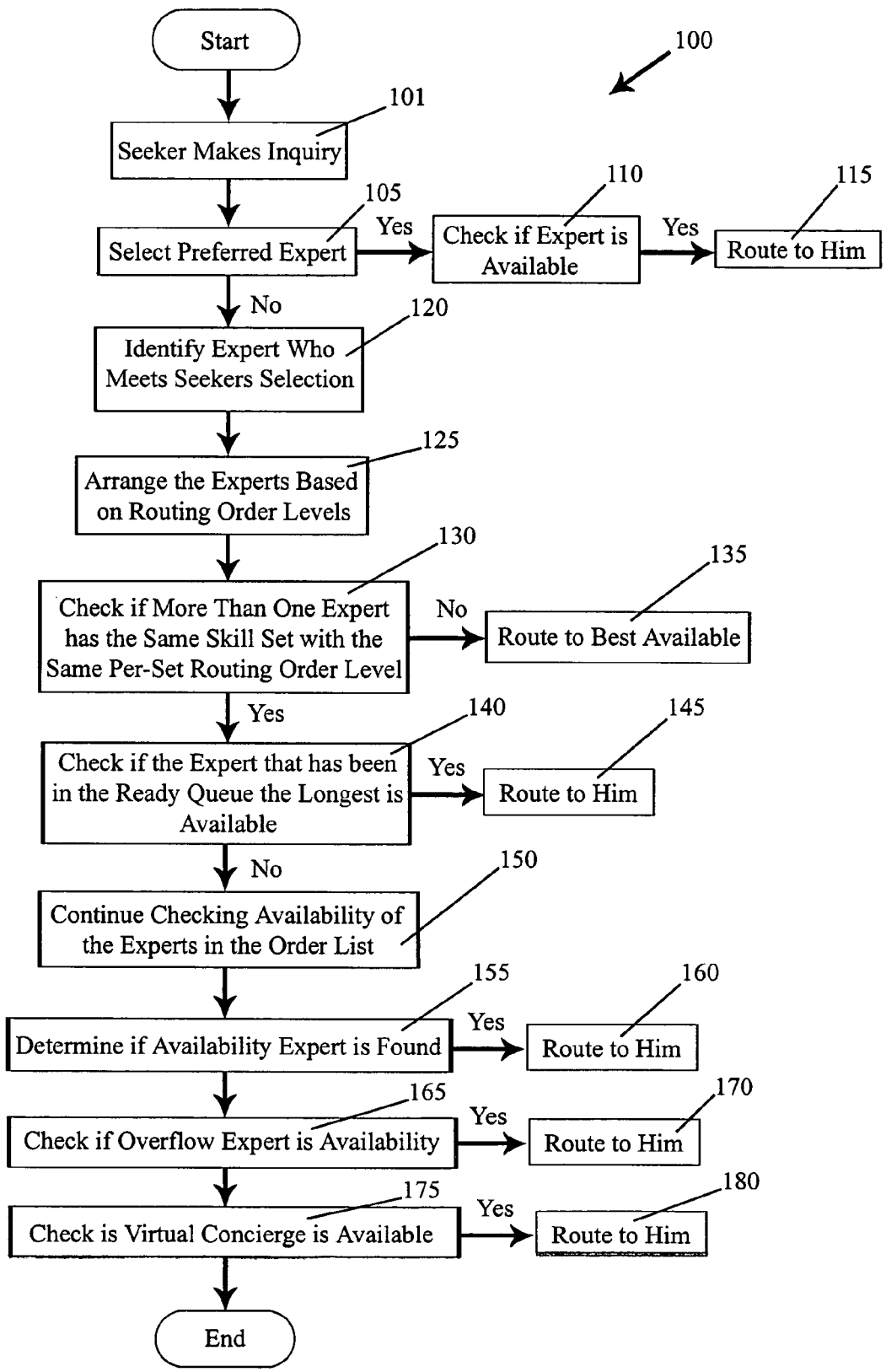
FIG. 1 is a flow diagram illustrating steps in accordance with an embodiment of the invention.

By way of overview and introduction, presented and described are embodiments of a match-and-route system platform that manages a company's expert resources, builds a skill-set hierarchy—by associating one or more experts with predefined criteria, and locates the best available expert—by setting routing orders among the experts. Associated with the system is a set of inquiry criteria, a set of clients, a set of users, and a series of user interface configuration selections, which control the look and feel of the platform.

The system uses a series of pre-selected subject categories referred to as inquiry criteria to formulate and characterize a user's inquiry. The system is accessible to both clients and users. Clients are corporations or other organizations that provide their members access to the systems Clients are able to configure the system to provide expertise to the entire organization or to subdivide the organization into departments or divisions and limit the subject matter of the inquiry. For instance, a financial institution is able to use the system to provide expertise to the company as a whole, on a wide array of topics, or may subdivide the company into departments such as accounting, legal or trade support and limit expert assistance to topics specifically pertaining to those departments. Associated with each department is a set of inquiry criteria, a set of users making inquiries, a set of experts, and a series of user interface configuration selections that control the look and feel of the platform for the user associated with that department. Additionally, the system is utilized to serve a number of business objectives, such as organizing information, supporting products, training new employees and providing consulting services.

Users are individuals enabled to use the system. Users serve multiple roles within the system. Users are provided with unique login names, and profiles are created for each individual user. Users serving in multiple capacities can have a profile for each capacity, alternatively a single profile can be arranged to provide different parameters depending on the capacity in which the user is acting.

In one capacity, a user acts as a seeker and creates inquiries. In another capacity, the same or different user can be an expert responding to inquiries. In yet another capacity, the user can be a system manager, charged with creating and maintaining the seeker, expert and manager profiles. The profiles are organized and stored in memory, e.g., a database.

The system is configured for each individual client and a catalogue of inquiry types is created during a configuration process individualized for each client. Each inquiry type is classified using one or more underlying criteria, which are subject categories, correlated to the client's business objectives. The criteria also reflect information needs of a user.

To formulate and characterize users' inquiries, the criteria are pre-designated by the client. This selection process can be manually performed, or automatically with the system's assistance. The catalogue of inquiry types provides a common framework upon which inquiries, users and knowledge are organized. This information can also be organized and stored in memory, e.g., a database.

Experts are identified and matched to specific areas of expertise. Each expert has individualized knowledge of at least one of the inquiry type's underlying criteria. Experts' skills may be identified with little effort if a company's department is organized around functions requiring specific expertise, or if job titles are defined based on skill sets required for a position. Additionally, managers, supervisors and other senior employees may be used as resources for skill identification based on their familiarity with the group's abilities and their knowledge of whom to seek for specific answers. Additional experts may be gathered by creating a virtual network of experts by interconnecting individuals from the company's partners, consultants, vendors and other closely linked sources across networked computers and databases. After identification of an expert's skills, the expert is classified by matching the expert's skills with one or more of the underlying criteria used to classify the inquiry types, thereby creating a relationship between the inquiry type and the expert.

When there are multiple experts matched to the same criteria or classified to the same inquiry type, the experts may be differentiated based on skill levels. Certain experts could be more knowledgeable than others on a specific criteria. Alternatively, or in conjunction, experts can be differentiated based on any additional specific attribute they possess. In the event of identically classified experts a preferred routing order is established.

In choosing a routing order, predetermined profiles are set by a user acting as a system manager considering a variety of characteristics. These characteristics include, but are not limited to, the most skilled expert, the most-cost effective expert, or some other basis. A seeker can also have predetermined indicators set by the user-manager in the seeker's profile that aids in selecting among similarly classified experts.

Expert profiles are created to capture the expert's information, such as name, organization, skill designations and preferred routing orders. After an initial set of experts is populated in the system, usage patterns will direct the balance between experts and requests and will identify the need for additional expertise.

FIG. 1 presents a flow diagram for process 100, which is a method in accordance with an embodiment of the invention. FIG. 1 can be better understood in conjunction with FIG. 2, which depicts a user interface that can be utilized by a user undergoing process 100. The following discussion describes Process 100 in FIG. 1 and refers to the arrangement depicted in FIG. 2. Through a secure login process, a user accesses a computer network to submit an inquiry, step 101, to a hosting server. Once the user's information is verified the session commences. The seeker is presented with a unique user interface Get Assistance Page 200 (FIG. 2) on the user's computer display.

The Get Assistance Page 200 displays the pre-designated inquiry criteria and helps guide seekers in precisely categorizing their inquiries by displaying values 203 for each inquiry criteria 201. Both the criteria 201 and the values 203 are capable of being represented as a series of pull down menus on the Get Assistance Page. Additionally, a seeker is able to narrow the focus of the inquiry by submitting, into a drop-down box, a brief textual description of the problem 220.

In an embodiment of the invention, values for inquiry criteria for the Get Assistance Page are selected from a seeker profile. Clients and users, within their various capacities, are assigned individualized profiles. The profiles capture information about the corporation or organization for the client, and capture information about the individual, including the name and organization or corporation for the users.

Predetermined indicators in the seekers' profiles can restrict the pool of qualified experts available to the seeker. Seeker profiles can also restrict those inquiry types available to the seeker by embedding inquiry criteria values as the predetermined indicator(s). When a seeker with such a profile enters the Get Assistance Page 200, these predetermined values are loaded into the corresponding inquiry criteria. Clients, user-managers or seekers themselves may pre-select the values for seekers' profiles, thereby limiting the scope of the inquiry. Thus, the pre-selected criteria values reside on the user's profile rather than on the Get Assistance Page 200. When the seeker chooses to make an inquiry, the values for pre-selected inquiry criteria may automatically display to the seeker or may be passed as hidden criteria and simply remain embedded during an inquiry. Further, a predetermined indicator in the user's profile can also be used to pre-select a group of experts from those qualified and available to whom the inquiries may be routed.

In another embodiment of the invention, subject list styles are used to categorize a user's inquiry. The subject lists provide an intuitive path for the seekers to define the scope of the assistance sought. The client has the opportunity to select an overall style for the subject lists to support its products, organizational information, processes, training, consulting services and additional business objectives. The subject lists specify the quantity and nature, e.g. context of the inquiry criteria and values used by a particular organization, organize the inquiry criteria and values into one or more groups, describe whether the relationship between the criteria is hierarchical or independent, describe whether the relationship between the values within the criteria is hierarchical or independent, and designate a parameter that conveys to the system which source to obtain the value for each criterion from, wherein the source is either the seeker's profile or the Get Assistance Page 200. When values are not stored in the seeker's profile, the seeker can select from among any of the values available for the inquiry criteria. The subject list styles are presented to a user in an interactive problem definition page.

The Get Assistance Page 200, also described herein as the problem definition page, allows a seeker to classify the nature of their problem in real-time to get an expert. The problem definition functionality is displayed in a Graphical User Interface. However, if a user-manager restricts the types of inquiries a seeker can make by embedding pre-selected inquiry criteria values in the seeker's profile, then the pre-selected values will be automatically embedded into the Get Assistance Page 200 once a user logs in. The seeker can be restricted from modifying or editing the pre-selected criteria set by the user-manager. Additionally, the client may pre-select the number of criteria with the restricted access, and additionally may organize the pre-selections hierarchically, with the value selected for the first criterion determining the values available for the second criterion, and so forth.

For instance, a user-manager in the automobile industry can create profiles for all the employees in the car sales department, in the truck sales department, in the motorcycle sales department and so on. A pre-selection can be made for all employees in the car department by limiting the first criteria to cars. The manager may further limit other inquiry criteria by embedding specific manufacturers, models or options in the profiles. Thus, for Employee X in the car sales department, the user-manager may create a profile which pre-selects the first criteria as cars, and the second criteria as Chevrolets. When employee X logs into the Get Assistance page to make an inquiry, the fields for the first two criteria are pre-selected. Employee X will be limited to seeking assistance on questions relating to cars and Chevrolets. The user-manager may additionally pre-select additional criteria. For instance, Employee X's inquiry can further be limited to a particular model of Chevrolet, e.g., the Impala, or the user-manager might decide to limit the employee to assistance on all two-door Chevrolet models. As can be readily apparent by persons of ordinary skill in the art other possibilities of arrangements exist, and these other possible arrangements are within the scope of the present invention.

In a further embodiment of the invention, the criteria and its values are organized as a hierarchical tree, where the value selected for the first criterion determines the available values for the second criterion, and so forth. The choice selected at one level will determine the inquiry criteria of choices available at the next level. In another embodiment, the criteria are organized non-hierarchically, i.e., independently, allowing any combination of criteria values to be selected. In an alternate embodiment, the criteria are organized as a mix of hierarchical and non-hierarchical values.

The maximum and minimum number of subject lists in an organizational structure can vary depending on the needs of the client. The number of available inquiry criteria selections within a subject list could be unlimited. However, the scope of the subject list should not be overwhelming, but rather just adequate enough to ensure that a seeker can sufficiently refine his request for assistance so that an expert is identified with the minimum of effort and time.

FIG. 3a presents sample styles of the subject lists. By way of example, a client may select an overall style for the subject list from various pre-designed standard types or may define additional subject list types. Subject lists located on the Get Assistance Page 200 are displayed as drop-down menus, although other listing arrangements are also equally suitable as is known by persons of ordinary skill in the art. Seekers then choose one item from each subject list to define their assistance request. Style 301 depicts an example of having a hierarchical search for the first three values, where the choice of each subsequent list is determined by the choice selected from the previous list, and the values are derived from the drop-down menus on the Get Assistance Page 200. The last subject list is non-hierarchical with the value also obtained from the Get Assistance Page. Style 310 illustrates a possible hierarchical subject list for the first three selections, with the values entered for the first two derived from the seeker's profile. The last two values are acquired form the Get Assistance Page 200, through the selection action of the seeker, where the selection for subject list three is still hierarchical but selection for subject list four is independent.

Style 320, FIG. 3a, shows another alternate combination of three subject lists, where the first subject list is hierarchical and the value is entered from the seeker's profile, the second subject list is hierarchical but the value is selected from the Get Assistance Page 200, and the third subject list is independent with the value also selected from the Get Assistance Page 200. Style 330, is an additional alternative, where all the subject lists are independent, but the values for the first list are entered from the seeker's profile while the remaining lists are chosen from the Get Assistance Page 200. Other combinations of hierarchical and independent subject list styles are shown in FIG. 3b.

Referring again to FIG. 1, the system queries the seeker, step 105, as to engaging a preferred expert, should one be known, and available. The preferred expert is a live human being, who is selected through the system's Get Assistance Page 200 from a list of recent sessions in which the seeker and expert engaged. At step 110, the server determines if the preferred expert is available, if yes the inquiry will be routed to that expert, step 115, and on-line collaboration session between the seeker and preferred expert can commence. If there is not a preferred expert, or one is not available, the inquiry will be routed to the best available expert using the inquiry criteria, step 120.

The matching function of the system uses the inquiry criteria to match the inquiry with one or more similarly classified experts and routes the inquiry to the most appropriate expert based on skill level, preferred routing order and availability. Specifically, the matching function uses inquiry and expert criteria to precisely match a seeker's request for assistance with qualified experts. Once the inquiry is routed, the seeker and expert will automatically enter an on-line collaboration session where they can address the inquiry. A combination of Internet technology and routing systems provide the infrastructure to support the automated session.

In conjunction with defining and structuring the subject lists, the clients also identify experts qualified to respond to seekers' requests for assistance. The system identifies the possible combinations of choices across the available subject lists, and assigns each unique combination to at least one expert, making the combination the expert's skill set. The system identifies experts who have knowledge and experience that match the skill sets. An ultimate match occurs when the identified best expert matches the combination of items selected from all available subject lists.

FIG. 4 presents a flow diagram for process 400, which is a method in accordance with an embodiment of the invention. Process 400 builds a pool of experts. At step 401, a unique skill set is assigned to at least one expert. Checks are made, step 410, to determine if additional experts are available for the same unique skill set. If there are additional experts, their names are placed in the category of available experts for that same skill set. It should be noted, that each expert is also capable of being provisioned for multiple skill sets. A prediction, step 420, is made regarding the amount of simultaneous session requests for a particular skill set. The number of experts provisioned with the same skill set is dependent on the projected or estimated volume of simultaneous session requests for that skill set. The number of experts provisioned to a skill set impacts the wait time seekers may experience.

Referring again to FIG. 1, experts are arranged based on routing order levels, step 125. Clients and users set routing orders among experts when multiple experts are provisioned with the same particular skill set and, thus, are qualified to respond to session requests regarding the same topic. Every skill set provisioned for an expert has a routing order number associated with it. By way of example, the numbers can range from 1-9, with 9 meaning "route here first" to 1 meaning "route here last." Other rankings and arrangements, which are easily apparent to a person of ordinary skill in the art, are applicable to this embodiment. At step 130, the system makes a determination of whether more than one expert has the same skill set with the same pre-set routing order level. If not, general routing procedures are followed, step 135, and the inquiry is matched with the best available expert.

If there is more than one expert, step 140, an aging factor representing the expert's time in the queue is used to arrange the experts. The inquiry is then routed, step 145, to the expert in the queue the longest. If the first expert on the ordered list is not available, the inquiry is re-routed to the next available expert in the ordered list. Thus, the seeker is always presented with the best available expert. Should there be no available expert, at step 150, the list is continuously checked until an available expert becomes available. During the entire process, the system re-checks, step 155, whether an expert higher on the list becomes available. If a higher ranked expert becomes available and a session is already in progress, the system can indicate to the seeker the availability of that expert.

At times all experts provisioned for a skill set can be either busy with other seekers, or not available. In one embodiment of the invention, the client (user-manager) identifies an additional expert as an Overflow Expert. The Overflow Expert is assigned a routing level which will indicate that when all other provisioned experts for the skill set are unavailable, the Overflow Expert is made available to the seeker. Thus, if a qualified, provisioned expert is unavailable, the inquiry may be re-routed, step 165, to a provisioned Overflow Expert.

The Over Flow expert is a live human being who at times might also be unavailable. Thus, in a further embodiment, when the Overflow Expert is unavailable or has not been assigned, a Virtual Concierge is provisioned, step 175, to answer session requests for any and all of the skill sets created by the client. The Virtual Concierge is capable of being a live human being. The Virtual Concierge's role is not to provide expertise but to give general guidance to the seeker, or to simply relay a client's generic message to a qualified expert when one becomes available. While a user is accessing the Virtual Concierge, the system continues to re-check if an expert higher in the routing order becomes available.

When assigning the routing orders, the client can have an array of factors, i.e., a catalogue of preferences, limited only by the system's hardware storage capacity. The routing order can denote levels of proficiency, e.g., from most experienced expert to one with a lesser degree of expertise. The routing order can denote which experts are to spend more of their available time answering session requests (e.g., level 8), and/or which experts should direct more of their attention to other company work (e.g., level 2)—but yet be available if other experts are already in sessions or otherwise unavailable. For instance, a company's CEO may only be available to answer questions for a particular pool of pre-selected users, while the company's entry level administrative assistant can be made available at all times to answer everyone's questions. Further, the CEO's profile can be set so as to exclude experts below some predetermined minimal level of expertise from being made available to the CEO. Thus, when a CEO makes an inquiry he can restrict the type of employees which can be made available to respond to his inquiries, e.g., only top management can be made available to respond, and if they are not available instead of accessing low level employees his inquiry will be routed to the Virtual Concierge.

Figure 5:
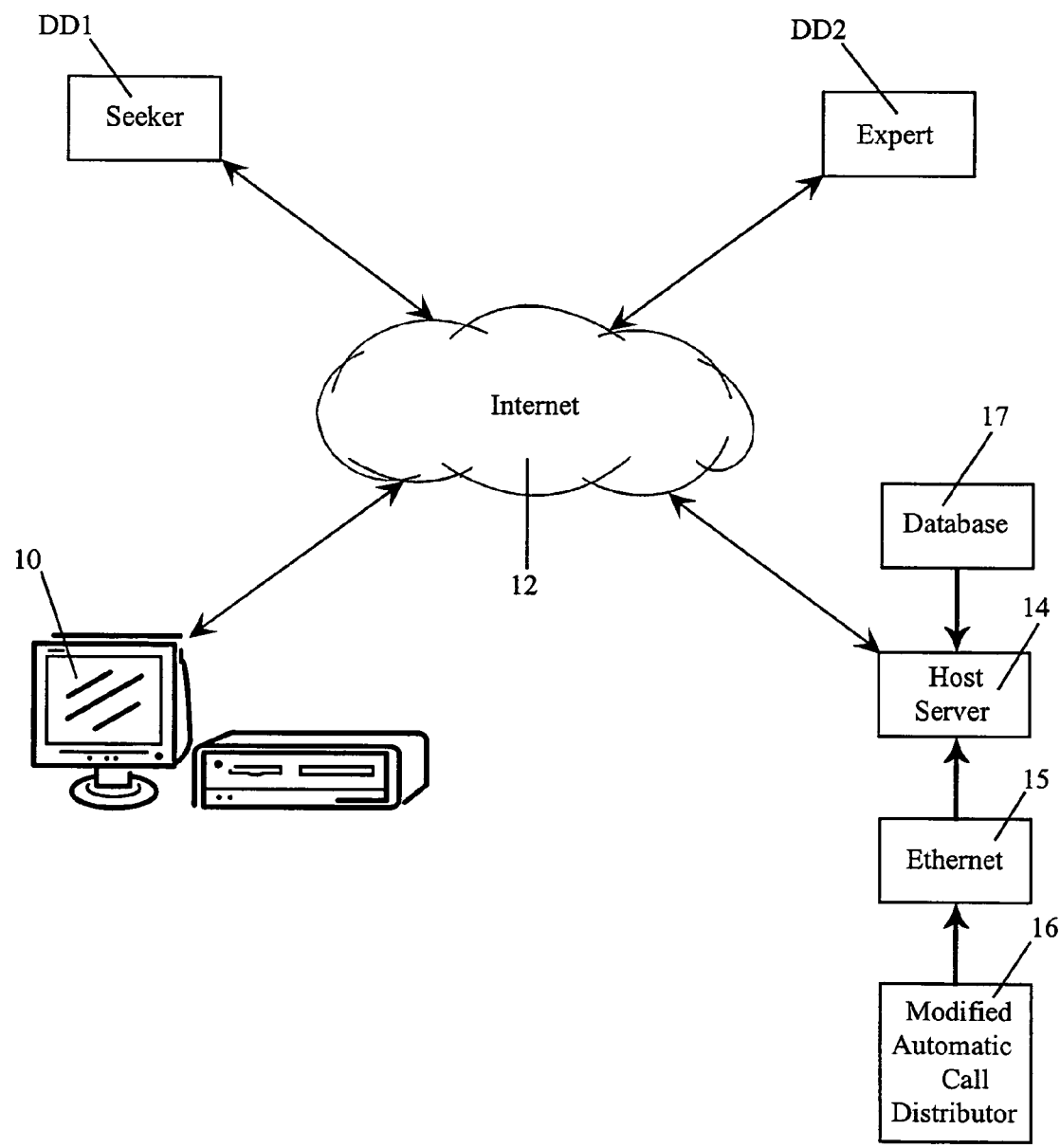
FIG. 5 illustrates an embodiment of a communication network environment suitable for implementing the present invention.

A combination of Internet technology and communications queuing and routing systems, such as automated call distribution systems, can provide the infrastructure to support the processes described above. FIG. 5, depicts a communication network environment suitable for implementing the present invention. This network environment includes a multimedia personal computer 10 connected to a communication network, e.g., the Internet 12 to access a host server 14 at some remote location. The multimedia computer 10 may for example include bidirectional audio/visual capability, e.g., speakers, microphone, or video camera. Optionally, connected to the multimedia computer is an electronic whiteboard, tablet, or other device that permits interactive document creation, viewing, and mark-up across the communication network. The multimedia computer 10 is provided at a remote location accessible to a seeker DD1, an individual desiring to locate an expert in a particular field of interest, and is also provided at a remote location accessible to the expert DD2.

The host server 14 provides a user interface, such as a Web page(s), using some Internet facility such as the World Wide Web. See for example FIG. 2 which illustrates the Get Assistance Page 200 graphical user interface. The host server 14 may be supplemented with a router server 16 such as a modified automatic call distributor 16 connected together via an Ethernet 15 or some other network device (local or remote) and protocol. A conventional automatic call distributor (ACD) is a computerized phone system that routes incoming telephone calls to operators or agents. Similar infrastructure and applications may be used to route the seeker's request to an available expert. In a preferred embodiment the seeker is put in communication with the next best available expert. The host server 14 contains a mass storage device, which contains a database 17. The mass storage device may be a hard drive, a floppy disk, a CD or flash memory.

In an additional embodiment of the invention, opportunities are provided for the clients to extract and formalize the knowledge revealed in the archived sessions. An end-of-session assessment may be conducted to direct the client's attention to the most valuable session archives. The information may be proliferated through updates to client training programs, documentation, call center knowledge bases, and self-help applications. Additionally, electronic management reports are provided, which convey usage on key client metrics, such as areas of seeker interest, inquiries by category and frequency, seeker and expert feedback regarding the quality, content, and value of the sessions, session duration and wait times. These metrics are capable of being used to assess the company's current knowledge base using reported data on the exposed need for information and expertise in its application to problems, the expertise available to the client's internal/external users and the depth and breadth of that expertise. The resulting analysis is capable of being used to impact corporate hiring and training strategies, processes, policies, and product changes as well as current knowledge management programs. Moreover, the reported data is capable of impacting the client's assessment of general business plans. Clustering "hits" on the subject lists from external users identify new revenue opportunities, enhance customer service strategies, and lead to products and sales strategy impacts. Reported volumes for internal user "hits" motivate improvements to documentation and internal processes.

Thus, while there have been shown, described, and pointed out fundamental novel features of the invention as applied to several embodiments, it will be understood that various omissions, substitutions, and changes in the form and details of the illustrated embodiments, and in their operation, may be made by those skilled in the art without departing from the spirit and scope of the invention. Substitutions of elements from one described embodiment to another are also fully intended and contemplated.

We claim:

1. A method of categorizing inquiries from a member of an organization by creating a subject list style in a match and route system, comprising the steps of:

receiving, from a first member of the organization, inquiry types reflecting information needs of members of the organization;

creating a catalog of inquiry types classified by one or more underlying criteria;

assigning values corresponding to an inquiry type for at least two different inquiry types in the catalog;

pre-selecting, prior to receiving an inquiry from a second member of the organization, a quantity of inquiry criteria and values in accordance with a predetermined context;

presenting to the second member at least a portion of the pre-selected inquiry criteria and values in an interactive manner, wherein the second member is presented those inquiry criteria received from the first member and their assigned corresponding values and the second member is restricted from modifying or editing the pre-selected criteria set by the first member;

organizing the inquiry criteria and values into one or more groups;

defining, prior to receiving the second member's inquiry, a first interrelationship between the inquiry criteria and the values, within each group, as being one of an independent, a hierarchical and a combination of independent/hierarchical;

designating a parameter that indicates a source from which inquiry criteria values are retrieved; and wherein the presenting step presents the inquiry criteria and the values in an interactive problem definition page that includes the first interrelationship.

2. The method of claim 1, further comprising the step of obtaining inquiry criteria values from the source of a seeker profile.

3. The method of claim 1, further comprising the step of obtaining inquiry criteria values from the source of a Get Assistance Page.

4. The method of claim 1, further comprising the step of displaying a subject list style as a drop down menu on the Get Assistance Page.

5. A system of creating a subject list style for presentation to a member of an organization using a match and route system, the system comprising:

a computer having a processor and a memory;

a database stored in memory containing at least one file for presenting a structure of an overall style for a subject list;

the database further including information on a quantity of inquiry criteria and values to be presented to a second member of the organization;

the information being received from a first member of the organization, and reflecting information needs of members of the organization;

the database connected to a plurality of monitors presenting the quantity of the inquiry criteria and values to the second member in an interactive manner, wherein the second member is presented those inquiry criteria and values received from the first member and the second member is restricted from modifying or editing the pre-selected criteria set by the first member;

the database further including information defining, prior to receiving the second member's inquiry, a first interrelationship between the inquiry criteria and values as being one of an independent, a hierarchical and a combination of independent/hierarchical;

the database also including a parameter that indicates a source from which inquiry criteria values are retrieved; and the processor being configured to extract unique combinations from the database and evaluate the combinations, and being further configured to pre-select, prior to receiving the second member's inquiry, a quantity of inquiry criteria and values in accordance with a predetermined context.

6. The method of claim 1, further including the steps of:

obtaining the second member's inquiry from the interactive definition page;

defining a second interrelationship between the inquiry criteria and the values based on a nature of the second member's inquiry; and representing the second interrelationship to the second member in the interactive problem definition page.

7. The system of claim 5, wherein the processor is further configured to obtain the second member's inquiry from one of the plurality of monitors, and define a second interrelationship between the inquiry criteria and the values based on the nature of the second member's inquiry.

* * * * *